March 24, 1925.

L. LISSON

TIRE COUPLING

Filed Sept. 4, 1924

1,530,837

INVENTOR.
Louis Lisson.
By Harry D. Wallace.
ATTORNEY.

Patented Mar. 24, 1925.

1,530,837

UNITED STATES PATENT OFFICE.

LOUIS LISSON, OF SYRACUSE, NEW YORK, ASSIGNOR OF TWO-THIRDS TO IRVING J. BERMAN AND MICHAEL LISSON, BOTH OF SYRACUSE, NEW YORK.

TIRE COUPLING.

Application filed September 4, 1924. Serial No. 735,849.

*To all whom it may concern:*

Be it known that I, LOUIS LISSON, a citizen of the United States, residing at Syracuse, in the county of Onondaga and State of New York, have invented certain new and useful Improvements in Tire Couplings, of which the following is a specification.

This invention relates to improvements in rubber tires, designed particularly for use in connection with the wheels of baby-carriages, go-carts, velocipedes, and like small vehicles, and has for its primary object to provide novel, simple and effective means for coupling the ends of split cushion tires, the said coupling being especially advantageous for repairing and renewing the tires. And a further object is to provide a coupling which consists of a round elongated body having an annular flange between its ends for dividing the body into substantially equal portions, and said portions being provided with external threads of the same pitch and preferably winding in the same direction, as right-hand, or left-hand threads, which may be screwed into the opposite ends of the tire, for drawing and holding said ends tightly together.

I attain these objects by the means set forth in the detailed description which follows, and as illustrated by the accompanying drawing, in which—

Figure 1:
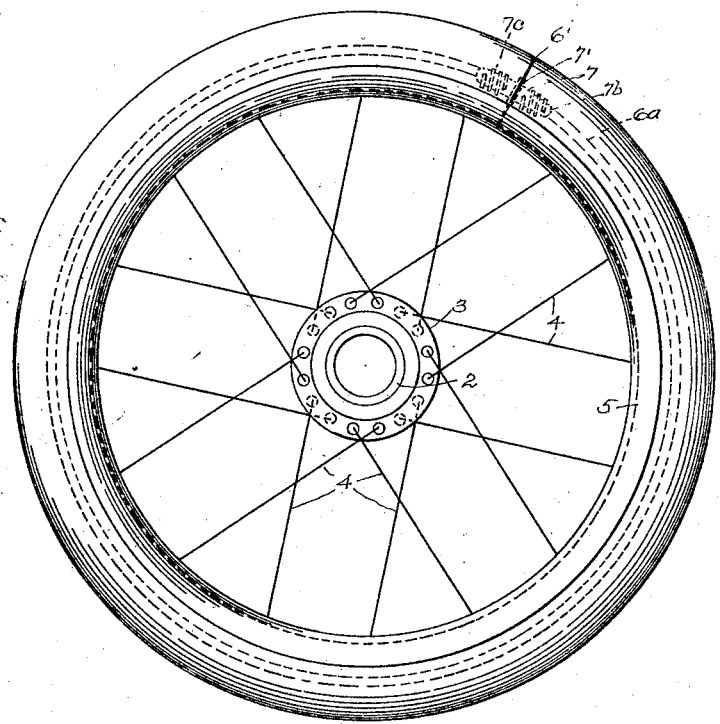
Figure 2:
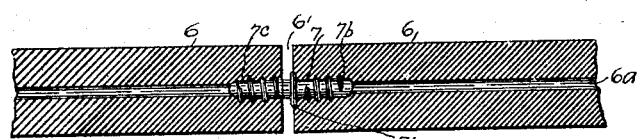

Figure 1 is a side elevation of a well-known vehicle wheel, to which my improvement is applied. Fig. 2 is a central longitudinal section through the split portion of a hollow tire, showing the coupling fully applied to one end of the tire and partially applied to the opposite end of the tire. And Fig. 3 is a view, partially in section, showing the coupling applied to a solid round tire.

In the drawing, 2 represents the hub of the wheel, 3 the spoke flange, and 4 the wire spokes, the latter supporting the usual metal rim 5, which is provided with a circumferential semi-circular groove to receive a round cushion tire, as 6. The tire 6 is preferably made smaller in diameter than the groove of the rim, and being more or less elastic, the tire is usually expanded and then sprung into said groove, in a well-known manner. Throughout the drawing, the tire is shown split, as at 6' or 6ᵉ, and its opposing ends are brought and held in close abutting contact by means of my improved coupling 7, as shown by dotted lines in Fig. 1. The tire 6 is preferably tubular, the opening therethrough as $6^a$, being relatively small. The coupling 7 comprises an elongated substantially cylindrical body, having a medial annular flange 7', which divides the body into similar end portions, as $7^b$—$7^c$, the said flange serving to limit the insertion of the end portions into the tube 6, as shown. The opposite ends of the coupling are both threaded, the said threads preferably winding in the same direction and being of the same pitch. By this construction and arrangement, the coupling may be applied to either end of the tire, without danger of unscrewing it from the other end of the tire. The body of the coupling is preferably slightly larger than the bore $6^a$ of the tire, for increasing the grip of the parts when the coupling is forcibly inserted into the said bore.

To start the coupling operation, the coupling is usually first screwed into one end of the tire as far as possible by hand. The operator then grips the coupling between the jaws of a pair of pliers and continues the screwing operation, until the flange 7' becomes partially embedded in the end of the tire. The operator, still holding the end of the tire to which the coupling has been applied, then grasps the opposite end of the tire and twists it towards the left (in case the threads of the coupling are right-hand as shown); four or five turns corresponding to the number of threads on the exposed portion of the coupling. He next inserts the said portion into the bore of the twisted end of the tire and exerts pressure for closing the gap between the ends of the tire, and at the same time twists the tire in the direction of the winding of the threads of the coupling. This effects the screwing of the loose end of the tire on to the coupling, the said operation being continued until the ends of the tire are brought into close contact, as shown in Figs. 1 and 3. In order to render the coupling more positive and to prevent the ends of the tire from spreading apart due to tractive and other strains, the threaded portions of the coupling are usually coated with shellac or a suitable cement, for increasing the adhesion of the parts.

Figure 3:
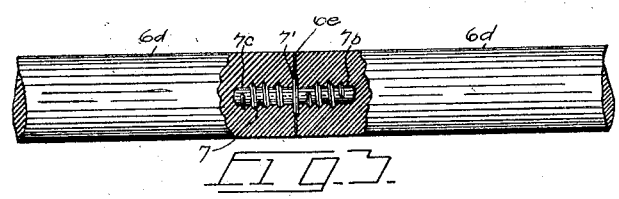

In Fig. 3 I have shown a solid round elastic tire $6^d$, which is split, as at $6^e$, like the tire 6. To apply the coupler 7 to the tire $6^d$, the operator usually first punctures the opposite ends of the tire by inserting an awl in the line of its longitudinal axis, and then screws the coupling into the punctures. The final operation of applying the coupling to the solid tire is substantially the same as hereinabove described for the tire 6.

My invention is extremely simple, and may be applied to the ordinary cushion tires without requiring any additional reinforcing or retaining parts. By reason of the novel self-retaining features of my one-part coupling, coil-springs and other devices which are commonly inserted in the hollow tires, and which tend to destroy their elasticity and resilience may be eliminated. My coupling may be produced at extremely low cost, and may be readily and quickly applied to either hollow or solid tires, by any person of common skill, and without requiring any special tools.

Having thus described my invention, what I claim, is—

1. The combination with a split hollow rubber tire for vehicles, of a coupling for securing and closing up the ends of the tire comprising a cylindrical body having a greater diameter than the bore of the tire and having a medial annular flange, the portions of the body at the opposite sides of the flange being formed with similar threads of greater diameter than the plain body of the coupling, the said threads winding in the same direction, and the said portions adapted to be screwed into the hollow ends of the tire until the flange becomes embedded in the ends sufficiently to effect the close abutting of said ends.

2. The combination with a split hollow rubber tire for vehicles, of a coupling for closing-up and securing the ends of the tire, comprising a cylindrical body adapted to be inserted in opposite directions into the hollow ends of the tire, the said body being of greater diameter than the bore of the tire, and having a relatively thin medial annular flange of greater diameter than the body adapted to engage the meeting ends of the tire for limiting the insertion of the coupling, the portions of the body beyond the said flange being formed with similar threads, the diameter of the convolutions of the threads being greater than the diameter of the body and the bore of the tire, said body adapted when screwed into the tire to form worm-like paths in the cushion walls of the bore for effecting the adhesive gripping of the parts for preventing accidental spreading of the ends of the tire.

3. The combination with a split cushion rubber tire, of a coupling comprising an elongated cylindrical body having its opposite end portions formed with similar relatively coarse spiral threads, the threaded portions of said body adapted to be screwed into the loose ends of the tire for simultaneously drawing the said ends towards each other, the said body being formed with a relatively thin medial annular flange which limits the insertion of said threaded portions into the ends of the tire, the said flange being spaced from the inner termini of the spiral threads, whereby the spongy material of the tire displaced by the threads expands radially towards the unthreaded portions of the body, adjacent the flange for hindering the accidental unscrewing of the coupling, and the said flange being relatively thin for facilitating the intimate joining of the ends of the tire.

In testimony whereof I affix my signature.

LOUIS LISSON.